Figure 3:
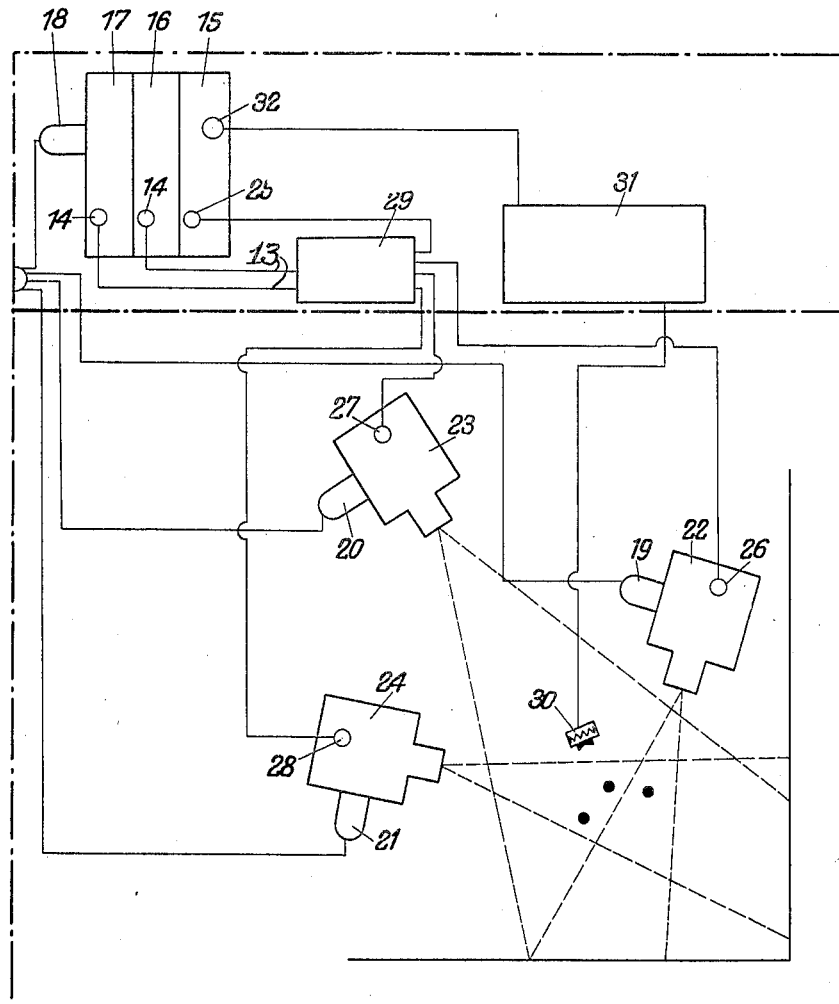

July 25, 1933.  K. DEGL  1,919,585
METHOD OF SECURING SYNCHRONISM IN SOUND FILMS
Filed Sept. 8, 1931   2 Sheets-Sheet 1
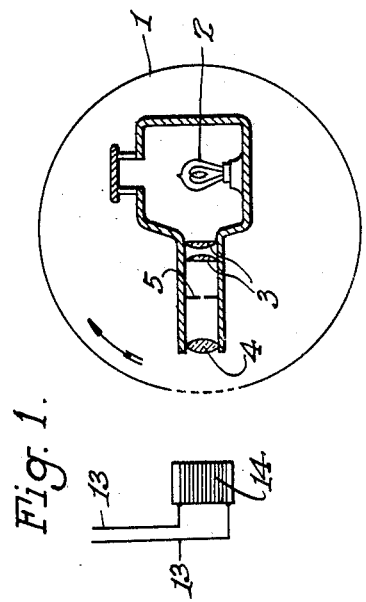
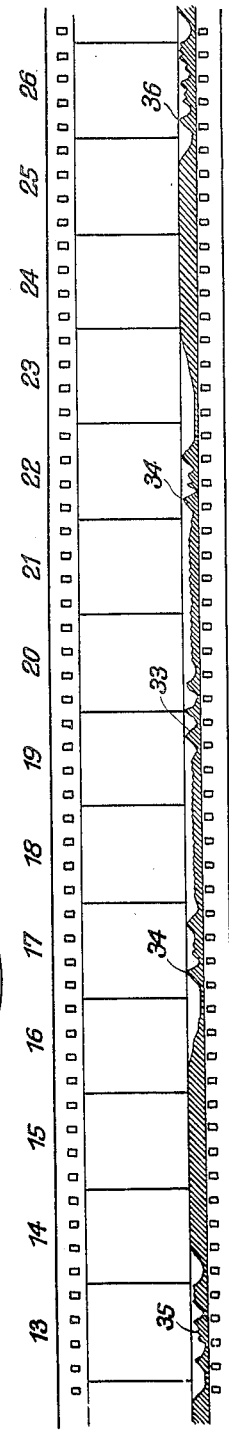
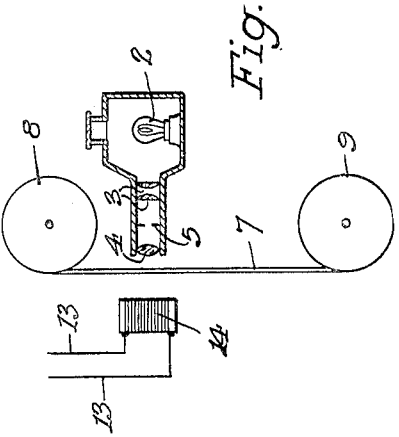
Inventor:
K. Degl Patented July 25, 1933

1,919,585

UNITED STATES PATENT OFFICE

KAREL DEGL, OF PRAGUE, CZECHOSLOVAKIA

METHOD OF SECURING SYNCHRONISM IN SOUND FILMS

Application filed September 8, 1931, Serial No. 561,782, and in Germany September 20, 1930.

The present invention relates to a device for securing synchronism in sound films by providing during production and at regular intervals both the sound film and the picture film negatives, or all picture film negatives if several cinematographic cameras are employed, with recurring identification marks of the libretto and the scene concerned and, further, with marks corresponding to consecutive film section numbers within each scene in order to indicate the harmonizing parts when the film is cut and combined. These marks are placed preferably within the otherwise unused zones of the sound and picture negatives, or between their perforations, by photographic means.

The accompanying drawings illustrate diagrammatically the device according to my invention.

Figs. 1 and 2 show the devices for controlling the application of recurring and consecutive marks respectively; Fig. 3 a diagram of the complete arrangement and Fig. 4 part of a film strip provided with synchronizing marks.

The device according to the invention is based on the well-known phenomenon that the electric resistance of a light sensitive cell, such as a selenium cell or a photo-electric cell, varies with the intensity of the light acting thereon and causes corresponding fluctuations in the electric circuit in which it is inserted. According to the invention both the sound and the picture recording apparatus, or all the picture recording apparatuses, if several be used, are provided each with a device of any known type for producing on the respective film the above-mentioned synchronizing marks, preferably photographically. This device may consist for instance of an oscillating mirror, if transverse, i. e. variable area impressions (see Fig. 4) are used, or in a lamp of varying lighting intensity, if striations of various degrees of density are used as synchronizing marks, such devices being well-known in the art. The electric circuit or circuits by which these marking devices are operated is so connected with the electric circuit of the light sensitive cell that all these marking devices are operated simultaneously and in the same manner in accord with the variations of electric resistance produced in the cell by the light acting upon the latter through a moving matrix, such as a band, drum shell, film strip or the like, which is punched or provided with striations of various degrees of density. It is thus obvious that periodic variations of electric resistance produced in the light sensitive cell by the master matrix cause all the films to be marked simultaneously with synchronizing marks which may differ in character from the marks of the master matrix but correspond with the latter as to periodicity.

The master device for recurring marks (Fig. 1) consists preferably of a rotating drum 1, of a source of light such as a lamp 2 placed inside said drum 1, of a light sensitive cell 14 such as a selenium cell, inserted into an electric circuit 13, and of a suitable system of lenses 3 and 4 with an apertured partition 5 placed inside said drum 1 by means of which rays of light from the lamp 2 are projected through the shell of the drum 1 and focused upon the cell 14. The master matrix consists of marks punched in the shell of the drum 1, or else of a film strip secured detachably to the drum 1 and provided with striations of various degrees of density.

The master device for consecutive marks (Fig. 2) consists preferably of a film strip 7 provided with striations of various degrees of density, two reels 8 and 9, from one of which the strip 7 is unwound and on the other of which the strip 7 is wound, of a source of light such as a lamp 2 placed at one side, and a light sensitive cell 14 such as a selenium cell inserted into an electric circuit 13 and placed at the other side of the strip 7, and of a suitable system of lenses 3 and 4 with an apertured partition 5 placed between said lamp 2 and said strip 7 and by means of which rays of light from the lamp 2 are projected through the strip 7 and focused upon the cell 14.

Fig. 3 shows the general arrangement if, for example, one sound camera and three picture cameras are employed.

The above described master devices for recurrent and consecutive marks are placed each in one of the compartments 16, 17 hereafter named emitting chambers, which preferably may be built or placed adjacent the sound camera 15, the matrices of the emitting chambers i. e. the drum 1 and the strip 7 being moved either by independent synchronous motors or together with the sound film band by a common motor 18 at the same speed. The motors 19, 20, 21 of the picture chambers 22, 23, 24 move synchronously with the motor 18. The matrices of the two emitting chambers 16, 17 are staggered relative to one another so that their marks are emitted alternately. The two selenium cells 14 as well as the illuminants 25, 26, 27, 28 arranged in the sound and picture cameras for assisting in the recording of the marks, or their regulating devices, are connected by cables to a suitable device 29 which imparts the current variations alternately caused by the two selenium cells 14 in circuit with the bulbs. The numerals 30, 31, 32 indicate the sound recording apparatus.

To indicate synchronism light-sound marks of any known system are employed. In Fig. 4, for instance, a film band is shown provided with so-called transverse light-sound marks serving as synchronism marks, the recurring chief mark (the libretto mark) bearing the number 33, the also recurring identification mark of the scene the number 34, and the consecutive section marks the numbers 35 and 36.

These marks are photographed on both the sound negative and the picture negatives and printed also on the service prints whereby the cutting of the film is greatly facilitated, as the corresponding sections of the sound film and of the various picture films can be readily ascertained by means of these marks. For this reason individual picture cameras may be stopped and started while production is going on whereby a considerable saving in film is effected.

The method may be used also for silent films in connection with scientific work or the like.

I claim:—

1. Film-marking apparatus for a plurality of sound and picture cameras comprising a master marking device which consists of a light sensitive cell a source of light, and a moving matrix, various parts of which have alternately varying degrees of permeability for light and which matrix is interposed between said cell and said source of light, separate marking devices attached each to one of the sound or picture cameras, and means for operating said marking devices simultaneously and in the same manner in respect to the variations of electric resistance produced in said light sensitive cell in said master device.

2. Film-marking apparatus for a plurality of sound and picture cameras, comprising a plurality of master marking devices, each consisting of a light sensitive cell, a source of light, and a moving matrix, various parts of which have alternately varying degrees of permeability for light and which matrix is interposed between said cell and said source of light, separate marking devices attached each to one of the sound or picture cameras, and means for operating said marking devices simultaneously and in the same manner in respect to the variations of electric resistance produced in said light sensitive cells in said master devices.

3. An apparatus for simultaneously and correspondingly marking films which are simultaneously run off in a plurality of cameras, comprising a pattern or stencil, an apparatus containing a photo-sensitive cell, past which the said pattern or stencil is moved, reproducing and marking devices provided at each camera, and a circuit interconnecting said light sensitive cell with said reproducing and marking devices so that all the films are substantially marked with synchronizing marks which correspond as to periodicity with the indicia on the said pattern or stencil.

KAREL DEGL.